I. HAYMAN.
SPRING HUB.
APPLICATION FILED OCT. 30, 1915.
1,187,989.
Patented June 20, 1916.
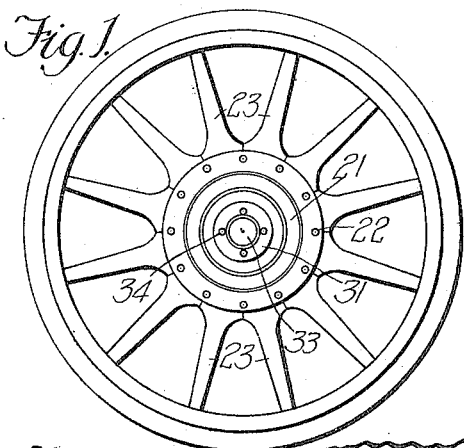
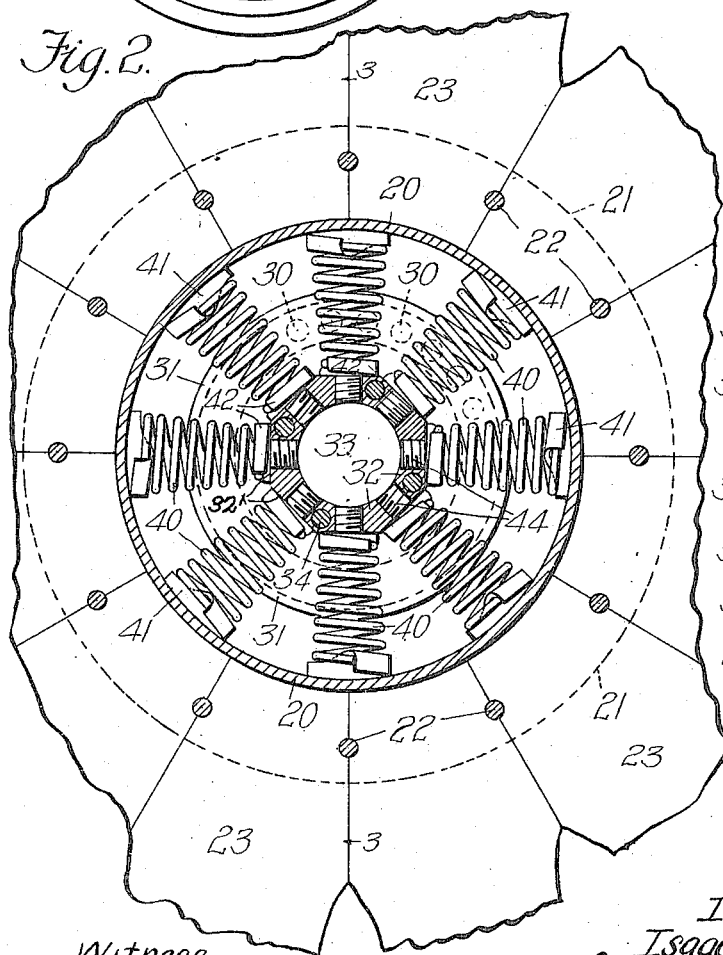
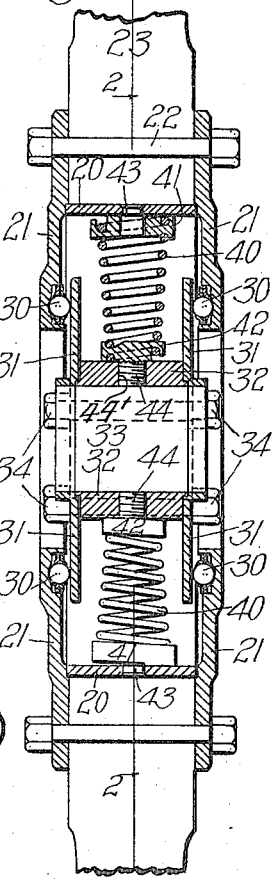

UNITED STATES PATENT OFFICE.

ISAAC HAYMAN, OF LOS ANGELES, CALIFORNIA.

SPRING-HUB.

1,187,989. Specification of Letters Patent. Patented June 20, 1916.

Application filed October 30, 1915. Serial No. 58,837.

*To all whom it may concern:*

Be it known that I, ISAAC HAYMAN, a citizen of the United States, residing at Los Angeles, in the county of Los Angeles, State of California, have invented new and useful Improvements in Spring-Hubs, of which the following is a specification.

This invention relates to spring hubs for vehicle wheels and the like; and it is the object of this invention to provide a simple and efficient means for obviating pneumatic tires on automobile wheels and the like.

I have shown a form of spring hub embodying my invention in the drawings in which—

Figure 1 is an elevation showing a wheel equipped with my spring hub, Fig. 2 is a vertical section taken as indicated by line 2—2 on Fig. 3 and Fig. 3 is a vertical section taken as indicated by line 3—3 on Fig. 2.

My spring hub includes essentially an outer member upon which the spokes of the wheel are mounted and an inner member adapted to be mounted upon a wheel axle, the two being connected together by certain resilient means, now to be explained. The outer member embodies an outer annular ring 20 and two annular side plates 21 which extend both inwardly and outwardly from the annular ring 20; the annular ring being held tightly between the side plates which are held together by the bolts 22. These bolts 22 also serve to hold the spokes 23 between the side plates, seated on the annular ring 20.

The side plates 21 carry, near their inner peripheries, annular ball bearings 30, which face inwardly toward each other; and side disks 31 of the inner member of the hub are held between these annular ball bearings and thereby constrained to move only in the plane of the wheel and in the planes of the disks 31 themselves. Side disks 31 are mounted directly and rigidly upon an inner central hub member 32 which has a bore 33 for mounting it upon an axle, or upon a bearing on an axle. Bolts 34 hold the side disks and the inner hub member 32 rigidly together; and it will be seen that the inner hub member 32 may thus move relatively to the outer member of my hub, but only in a plane parallel to the side disks and the side plates 21, or in the plane of the wheel itself. The ball bearings 30 allow movement of the inner hub member in any direction in said plane of movement.

I employ radially compressive resilient means between the outer annular ring and the inner hub member 32; preferably in the form of conical compressive springs 40 which are mounted on outer and inner seats 41 and 42. These inner members are constructed as is shown in the drawings so that the ends of the springs may be engaged with them by rotating or screwing the springs into the seats. The outer members are revolubly mounted upon the outer annular ring 21 by being mounted on suitable studs 43; and the inner members are radially adjustable with reference to the inner hub member 32 by means of a screw threaded stud 44 forming a part of each inner seat member and screw threaded into openings 44' in the angular outer faces 32' of the inner hub member 32. It will be seen that the inner seat member may be radially adjusted in position by rotating the whole spring and the two seats, rotating the inner seat 42 and its stud 44 so as to move the inner seat away from or toward the inner hub member 32. The thread on the stud 44 is preferably pitched in such a direction that rotation of the spring 40 in a direction to move the inner seat member 42 away from the hub member 32 will also tend to screw the spring farther into the member rather than to unscrew it.

The inner hub member 32 is preferably polygonal in its outer configuration, and a spring is placed against each polygonal face of the hub member, as is clearly shown in the drawings. The number and individual strength of said springs may be designated to suit conditions, depending upon the weight which the wheel is designed to carry; and, then, adjustment of the inner seat will adjust the spring action accurately.

It will be noted that, with my construction, the outer part of the hub, and the wheel carried thereon, has a certain freedom of movement relative to the inner part of the hub and to the wheel axle. Inequalities or roughness of a road surface will induce and allow the wheel (which may be equipped with a solid rubber tire) to move vertically; but the resilient means between the wheel and the axle acts to prevent these vertical movements being directly transmitted to the axle.

I do not limit myself to the precise mechanism and design shown and explained herein, as changes in detail of design and construction may be made without departing from my invention.

Having described a preferred form of my invention, I claim:

A spring hub construction comprising an annular ring, an axle receiving member positioned therein and having a plurality of outer angularly arranged faces having threaded openings therethrough, radially inwardly extending studs upon said ring in substantial axial alinement with the said openings, outer seats revolubly mounted upon the said ring studs, radially adjustable inner seats having threaded engagement with the said openings and springs connecting the said seats, the said springs being of conical form and the said seats being of different diameters in contact therewith, the said springs and seats being bodily rotatable together, removal preventing connections between said inner seats and springs operable during the compression increasing adjustment of said springs, and anti-frictionally spaced side inclosing members carried by said ring and axle receiving member.

In witness that I claim the foregoing I have hereunto subscribed my name this 25th day of October, 1915.

ISAAC HAYMAN.

Witnesses:
JAMES T. BARKELEW,
ELWOOD H. BARKELEW.

Copies of this patent may be obtained for five cents each, by addressing the "Commissioner of Patents, Washington, D. C."